United States Patent [19]

Hintz et al.

[11] Patent Number: 4,980,381
[45] Date of Patent: Dec. 25, 1990

[54] PREPARATION OF BEAD-FORM EXPANDABLE STYRENE POLYMERS

[75] Inventors: Hans Hintz, Ludwigshafen; Uwe Guhr, Gruenstadt; Klaus Hahn, Kirchheim; Hans G. Keppler, Weinheim, all of Fed. Rep. of Germany

[73] Assignee: BASF Aktiengesellschaft, Ludwigshafen, Fed. Rep. of Germany

[21] Appl. No.: 532,741

[22] Filed: Jun. 4, 1990

[30] Foreign Application Priority Data

Jun. 28, 1989 [DE] Fed. Rep. of Germany ....... 3921147

[51] Int. Cl.$^5$ ............................................... C08J 0/00
[52] U.S. Cl. ......................................... 521/56; 521/60; 526/346; 526/347
[58] Field of Search ................... 521/56, 60; 526/346, 526/347

[56] References Cited

U.S. PATENT DOCUMENTS

| 3,192,169 | 6/1965 | Doak | 521/56 |
| 3,386,926 | 6/1968 | Paris | 54/56 |
| 3,462,380 | 8/1969 | Rouden et al. | 521/56 |
| 3,647,723 | 3/1972 | Mysik et al. | 521/56 |
| 3,657,162 | 4/1972 | Finestone et al. | 521/56 |
| 3,835,073 | 9/1974 | Thimas | 521/56 |
| 4,129,706 | 12/1978 | Keppler et al. | 521/56 |
| 4,609,512 | 9/1986 | Rigler et al. | 521/56 |
| 4,769,392 | 9/1988 | Lozachmeur | 521/56 |

Primary Examiner—Morton Foelak
Attorney, Agent, or Firm—Oblon, Spivak, McClelland, Maier & Neustadt

[57] ABSTRACT

Bead-form expandable styrene polymers are obtained by suspension polymerization of styrene with addition of from 1 to 10% by weight of $C_3$- to $C_6$-hydrocarbons as blowing agents and, if desired, customary additives, where (a) the polymerization is initiated by rapidly heating the polymerization batch to form 80° to 90° C. within a maximum of 2 hours, (b) subsequently allowing the reaction temperature to increase to from 120° C. to 130° C. by from 8° to 17° C. per hour, and (c) the conversion is formed 30 to 60% when 100° C. is reached, and (d) the conversion is 80% or more when the maximum temperature is reached, and (e) the batch is subsequently kept at from 100° to 130° C. until the residual monomer content in the polymer has dropped to less than 0.1%.

3 Claims, No Drawings

PREPARATION OF BEAD-FORM EXPANDABLE STYRENE POLYMERS

The present invention relates to a process for the preparation of bead-form expandable styrene polymers having improved expandability. Foams based on styrene polymers have achieved great industrial importance as heat-insulating materials and packing materials. They are produced on an industrial scale by first preparing expandable styrene polymers by suspension polymerization of styrene in the presence of a blowing agent, foaming these styrene polymers by heating to form foam particles, and subsequently welding the foam particles in molds to form moldings.

The long reaction time in the suspension polymerization and the unsatisfactory throughput during foaming of the expandable styrene polymers to form foam beads were regarded as disadvantageous.

It is an object of the present invention to reduce the reaction time in the polymerization and simultaneously to produce products which can be foamed at high throughput without adversely affecting the dimensional stability of the foam moldings produced therefrom.

We have found, surprisingly, that these objects are achieved by carrying out the reaction in a modified manner.

The present invention relates to a process for the preparation of bead-form expandable styrene polymers by polymerization of styrene, if desired with further comonomers, in aqueous suspension in the presence of customary suspension stabilizers and customary styrene-soluble polymerization catalysts and with addition of from 1 to 10 percent by weight of a $C_3$- to $C_6$-hydrocarbon as blowing agent and, if desired, customary additives in effective amounts, which comprises (a) initiating the polymerization by rapidly heating the polymerization batch to from 80° to 90° C. within a maximum of 2 hours,
(b) subsequently allowing the reaction temperature to increase up to from 120° to 130° C. by from 8° to 17° C. per hour, and wherein
(c) the conversion is from 30 to 60% when 100° C. is reached, and
(d) the conversion is 80% or more when the maximum temperature is reached, and which comprises
(e) subsequently keeping the batch at from 100° to 130° C. until the residual monomer content of the polymer has dropped to less than 0.1%.

For the purposes of the invention, styrene polymers are polystyrene and copolymers of styrene with other $\alpha,\beta$-olefinically unsaturated compounds containing 50 parts by weight of styrene or more in copolymerized form. Examples of suitable comonomers are $\alpha$-methylstyrene, ring-halogenated styrenes, ring-alkylated styrenes, acrylonitrile, acrylates or methacrylates of alcohols having from 1 to 8 carbon atoms, N-vinyl compounds, such as vinyl carbazole, maleic anhydride or also small amounts of compounds containing two polymerizable double bonds, such as butadiene, divinylbenzene or butanediol diacrylate.

As blowing agents, the molding compositions contain from 1 to 10% by weight, preferably from 2 to 8% by weight, in particular from 3 to 7% by weight, of a $C_3$- to $C_6$-hydrocarbon, such as propane, butane, isobutane, n-pentane, i-pentane, neopentane and/or hexane. A commercially available pentane mixture is preferably used.

The styrene polymers may also contain customary additives of other substances which impart certain properties to the expandable products. Examples which may be mentioned are flameproofing agents based on organic bromine or chlorine compounds, such as trisdibromopropyl phosphate, hexabromocyclododecane and chlorinated paraffin and synergists for flameproofing agents, such as dicumyl peroxide and highly unstable organic peroxides; furthermore antistatic agents, stabilizers, dyes, lubricants, fillers and substances which have an anti-adhesive action during pre-foaming, such as zinc stearate, melamine-formaldehyde condensates or silica, and agents for shortening the demolding time during final foaming, for example glycerol esters or hydroxycarboxylates. Depending on the intended action, the additives may be homogeneously distributed in the particles or in the form of a surface coating.

The suspension polymerization of styrene is known per se. It is described in detail in Kunststoff-Handbuch, Volume V, Polystyrene, Carl Hanser-Verlag, pages 679 to 688. In this process, styrene, if appropriate together with the abovementioned comonomers is generally suspended in water, customary organic or inorganic suspension stabilizers being added, preferably in an amount of from 0.05 to 2% by weight, based on the suspension.

The styrene polymers according to the invention are prepared by polymerization of styrene, if desired together with up to 50% by weight of the abovementioned comonomers, in aqueous suspension, the above-described blowing agents and, if desired, customary additives in effective amounts being added before, during or after the polymerization.

It is also possible to carry out the polymerization in the presence of a customary chain-transfer agent which regulates the molecular weight. tert-Dodecyl mercaptan is preferably used. The regulator is generally used in an amount of from 0.0001 to 0.01% by weight, based on styrene.

It is essential to the invention to initiate the polymerization by rapidly heating the polymerization batch to from 80° to 90° C. The batch is generally heated from room temperature up to from 80° to 90° C. with stirring within 20 to 120 minutes, preferably 60 to 120 minutes.

It is furthermore essential to the invention that the reaction temperature is subsequently allowed t rise to from 120° to 130° C. by from 8° to 17° C. per hour, preferably by from 9° to 15° C. per hour. Since the reaction is exothermic, this rise in temperature is controlled by appropriate cooling.

It is moreover essential to the invention that the conversion is from 30 to 60%, preferably from 30 to 55%, in particular from 30 to 40%, when 100° C. is reached, i.e. 30 to 60% of the conversion should take place during the increase in temperature to 100° C., which can easily be monitored by appropriate sampling and analysis.

It is also essential to the invention that the conversion is 80% or more, preferably from 80 to 98%, when the maximum temperature is reached (i.e. from 120° to 130° C.), and that the batch is subsequently kept at from 100° to 130° C. until the residual monomer content of the polymer has dropped to less than 0.1%, preferably less than 0.09%, in particular less than 0.08%.

The novel process makes it possible to shorten the reaction time by from 1 to 2 hours compared with the conventional process.

The temperature control according to the invention makes it possible to positively affect the molecular weight and the molecular weight distribution of the polymer and consequently the rheological properties which are responsible for the expandability. The reduction in the melt extensibility which is thus achieved results in improved expandability. At the same melt extensibility, the reduction in the reversible elongation results in improved dimensional stability. Both properties can be measured in accordance with the method in Prüfung hochpolymerer Werkstoffe, Carl Hanser Verlag, Vienna, 1977, page 422, as follows:

The polymer particles are melted by heating to 155° C. and degassed for 5 minutes to evaporate the blowing agent. A polymer strand having a length of 20 mm and a diameter of 5 mm is produced by extrusion. The sample is clamped into a tension apparatus in hot silicone oil at 150° C. It is extended at a tensile stress of $2.10^4$ Pa to a length of 300 mm. The melt extensibility $\mu$ is derived from a ratio of tensile force to a rate of elongation. After the tensile stress is released, the sample shrinks again. The reversible elongation $E_r$ is the natural logarithm of the ratio of the initial length of the sample to the length of the sample after shrinkage.

The particulate, blowing agent-containing styrene polymers prepared according to the invention have a melt extensibility of less than $3.5.10^6$ (Pas), preferably less than $3.10^6$ (Pas), and a reversible elongation of less than 0.95, preferably less than 0.85, measured by the method described.

The blowing agent-containing styrene polymer particles prepared according to the invention generally have a diameter of from 0.2 to 4 mm. They can be prefoamed by customary methods, for example using steam to give foam particles having a diameter of from 0.5 to 2 cm and a bulk density of from 0.005 to 0.1 g/cm$^3$. It is apparent that the throughput is considerably increased here and that the bulk density is reduced under constant foam conditions.

The pre-foamed particles can then be subjected to final foaming by customary processes to give foam moldings having a density of from 0.005 to 0.1 g/cm$^3$.

In the examples, parts and percentages are by weight.

The table shows the improved expandabilities according to the invention, as the throughput (kg/h) at comparable bulk densities, and the attendant melt extensibilities $\mu$ (Pas) and reversible elongations $E_r$, both reduced according to the invention.

EXAMPLE 1

1a Polymerization

A mixture of 150 parts of water, 0.1 part of sodium-pyrophosphate, 100 parts of styrene, 0.15 part of benzoyl peroxide and 0.25 part of t-butyl perbenzoate (as polymerization initiators) was heated to 85° C. in the course of 2 hours with stirring in a pressure-tight stirred reactor made from stainless steel. The temperature was subsequently increased continuously to 120° C. over the course of 3.5 hours. After 2 hours from 85° C., 2 parts of a 10% strength aqueous solution of polyvinylpyrrolidone were added. After 3 hours from 85° C., 7 parts of pentane were metered into the stirred reactor. The mixture was then stirred at 120° C. for a further 5 hours. The conversion was 50% when 100° C. had been reached and 98% when the maximum temperature of 120° C. had been reached. After 5 hours at 120° C., the polymer only had a styrene content of 0.09%. The batch was subsequently cooled, and the polymer was separated off, washed and dried.

The granules obtained exhibited a mean particle diameter of 1.5 mm.

1b Coating 100 parts of the expandable polystyrene granules having a bead fraction of from 1.0 to 2.3 mm in diameter were drum-coated in a paddle mixer for 3 minutes with 0.4 part of glycerol monostearate.

1c Processing

The coated EPS beads were pre-foamed to a bulk density of 15 g/l±0.1 g/l in a continuous stirred foamer, Rauscher type, using flowing steam, and the throughput in kg/h was determined.

EXAMPLE 2

Polymerization

A mixture of 150 parts of water, 0.1 part of sodium pyrophosphate, 100 parts of styrene, 0.15 part of benzoyl peroxide and 0.25 part of t-butyl perbenzoate (as polymerization initiators), 0.7 part of hexabromocyclododecane as flameproofing agent and 0.2 part of dicumyl peroxide as synergist was heated to 85° C. over 100 minutes with stirring in a pressure-tight stirred reactor made from stainless steel. The temperature was subsequently increased continuously to 120° C. over the course of 3 hours. After 1.5 hours from 85° C., 2 parts of a 10% strength aqueous solution of polyvinylpyrrolidone were added. After 2.5 hours from 85° C., 7 parts of pentane were metered into the stirred reactor. The mixture was then stirred for a further 6 hours while the temperature was slowly reduced from 120° to 110° C. The conversion was 30% when 100° C. had been reached and 80% when the maximum temperature of 120° C. had been reached. After completion of the reaction, the polymer only had a styrene content of 0.09%. The batch was subsequently cooled, and the polymer was separated off, washed and dried.

The granules obtained exhibited a mean particle diameter of 1.5 mm.

Coating and processing correspond to points (1b) and (1c).

EXAMPLE 3

Polymerization

A mixture of 150 parts of water, 0.1 part of sodium pyrophosphate, 100 parts of styrene, 0.15 part of benzoyl peroxide and 0.25 part of t-butyl perbenzoate (as polymerization initiators), and 0.005 part of the chain-transfer agent tert-dodecyl mercaptan was heated to 85° C. over the course of 90 minutes with stirring in a pressure-tight stirred reactor made from stainless steel. The temperature was subsequently increased continuously to 125° C. over the course of 3.5 hours. After 2 hours from 85° C., 2 parts of a 10% strength aqueous solution of polyvinylpyrrolidone were added. After 3 hours from 85° C., 7 parts of pentane were metered into the stirred reactor. The mixture was then stirred at 120° C. for a further 5 hours. The conversion was 35% when 125° C. had been reached and 85% when the maximum temperature of 125° C. had been reached. After 5 hours at 125° C., the polymer only had a styrene content of 0.09%. The batch was subsequently cooled, and the polymer was separated off, washed and dried.

The granules obtained exhibited a mean particle diameter of 1.5 mm.

Coating and processing correspond to points (1b) and (1c).

EXAMPLE 4

The procedure was as in Example 2, but 0.005 part of the chain-transfer agent tert-dodecyl mercaptan was added as a substance which further improves the expandability. The conversion was 32% when 100° C. had been reached and 82% when 120° C. had been reached. The styrene content of the polymer was 0.1%.

Coating and processing correspond to points (1b) and (1c).

EXAMPLE 5 (Comparisons)

The mixtures as per Examples 1 (Example 5.1) and 2 (Example 5.2) were heated to 85° C. over the course of 3 hours with stirring in a pressure-tight stirred reactor made from stainless steel. The temperature was subsequently increased continuously to 120° C. over the course of 5 hours. Otherwise, the procedure of Example 1 was followed.

Coating and processing correspond to points (1b) and (1c).

TABLE

| | Expandability as throughput (at a bulk density of 15 g/l) kg/h | Expandability as the minimum bulk density achievable after 6 minutes pre-foaming in flowing steam (1 bar abs.) in a Rauscher box g/cm$^3$ | Melt extensibility $\mu$ Pas | Reversible elongation $E_r$ |
|---|---|---|---|---|
| Example 1 | 140 | 0.0105 | $2.3 \cdot 10^6$ | 0.8 |
| Example 2 | 137 | 0.011 | $2.4 \cdot 10^6$ | 0.82 |
| Example 3 | 145 | 0.010 | $2.9 \cdot 10^6$ | 0.85 |
| Example 4 | 145 | 0.010 | $2.6 \cdot 10^6$ | 0.79 |
| Example 5.1 as comparison | 105 | 0.012 | $5.6 \cdot 10^6$ | 1.1 |
| Example 5.2 as comparison | 110 | 0.0125 | $4.2 \cdot 10^6$ | 1.0 |

We claim:

1. A process for the preparation of a bead-form expandable styrene polymer by polymerization of styrene, if desired with further comonomers, in aqueous suspension in the presence of customary suspension stabilizers and customary styrene-soluble polymerization catalysts and with addition of from 1 to 10% b $C_3$- to $C_6$-hydrocarbon as blowing agent and, if desired, customary additives in effective amounts, which comprises
   (a) initiating the polymerization by rapidly heating the polymerization batch to from 80° to 90° C. within a maximum of 2 hours,
   (b) subsequently allowing the reaction temperature to increase to from 120° C. to 130° C. by from 8° to 17° C. per hour, and wherein
   (c) the conversion is from 30 to 60% when 100° C. is reached, and
   (d) the conversion is 80% or more when the maximum temperature is reached, and which comprises
   (e) subsequently keeping the batch at from 100° to 130° C. until the residual monomer content in the polymer has dropped to less than 0.1%.

2. A process as claimed in claim 1, wherein the polymerization is carried out in the presence of a customary chain-transfer agent, in particular tert-dodecyl mercaptan, in an amount of from 0.0001 to 0.01% by weight, based on styrene.

3. A method of using an expandable styrene polymer prepared as claimed in claim 1 for the production of foam moldings having a density of from 0.005 to 0.1 g/cm$^3$.

* * * * *